United States Patent
Smith (10) Patent No.: US 6,742,828 B2
(45) Date of Patent: Jun. 1, 2004

(54) CONTAINER COVERING APPARATUS (75) Inventor: Fred P. Smith, Alpine, UT (US)

(73) Assignee: John Donovan Enterprises, Inc., Stuart, FL (US)

( * ) Notice: Subject to any disclaimer, the term of this patent is extended or adjusted under 35 U.S.C. 154(b) by 0 days.

(21) Appl. No.: 10/259,105

(22) Filed: Sep. 24, 2002

(65) Prior Publication Data

US 2004/0056505 A1 Mar. 25, 2004

(51) Int. Cl.[7] .............................................. B60J 11/00
(52) U.S. Cl. ........................................................ 296/98
(58) Field of Search .......................................... 296/96

(56) References Cited

U.S. PATENT DOCUMENTS

| | | | |
|---|---|---|---|
| 2,591,186 A | 4/1952 | Neitzke | 296/98 |
| 2,594,910 A | 4/1952 | Germann | 296/98 |
| 3,467,431 A | 9/1969 | Turcotte | 296/98 |
| 3,498,666 A | 3/1970 | Harrawood | 296/100 |
| 3,515,428 A * | 6/1970 | Killion | 296/98 |
| 3,549,197 A | 12/1970 | Sibley | 296/100 |
| 3,549,199 A * | 12/1970 | Sibley | 296/98 |
| 3,628,826 A | 12/1971 | Sibley | 296/98 |
| 3,759,568 A | 9/1973 | Unruh | 296/98 |
| 3,774,958 A | 11/1973 | Thorpe | 296/98 |
| 3,854,770 A | 12/1974 | Grise et al. | 296/98 |
| 3,868,142 A * | 2/1975 | Bachand et al. | 296/98 |
| 3,977,719 A | 8/1976 | Thurston | 296/98 |
| 4,023,857 A * | 5/1977 | Killion | 296/98 |
| 4,030,780 A * | 6/1977 | Petretti | 296/98 |
| 4,046,416 A | 9/1977 | Penner | 296/98 |
| 4,050,734 A * | 9/1977 | Richard | 296/98 |
| 4,082,347 A | 4/1978 | Petretti | 296/98 |
| 4,126,351 A | 11/1978 | Peteretti | 296/100 |
| 4,341,416 A * | 7/1982 | Richard | 296/98 |
| 4,516,802 A * | 5/1985 | Compton | 296/98 |
| 4,529,098 A | 7/1985 | Heider et al. | 220/211 |
| 4,842,323 A * | 6/1989 | Trickett | 296/98 |
| 4,874,196 A * | 10/1989 | Goldstein et al. | 296/98 |
| 4,893,864 A | 1/1990 | Bailey | 296/98 |
| 4,909,563 A | 3/1990 | Smith | 296/98 |
| 4,981,317 A * | 1/1991 | Acosta | 296/98 |
| 5,031,955 A | 7/1991 | Searfoss | 296/98 |
| 5,054,840 A | 10/1991 | Wilhite | 296/98 |
| 5,058,956 A * | 10/1991 | Godwin, Sr. | 296/98 |
| 5,125,713 A | 6/1992 | Willingham et al. | 296/98 |
| 5,180,203 A | 1/1993 | Goudy | 296/98 |
| 5,218,743 A | 6/1993 | Miller | 24/68 |
| 5,238,287 A | 8/1993 | Haddad, Jr. | 296/98 |
| 5,240,303 A | 8/1993 | Hageman | 296/98 |
| 5,292,169 A | 3/1994 | O'Brian | 296/98 |
| 5,328,228 A | 7/1994 | Klassen | 296/98 |
| 5,337,818 A | 8/1994 | Coad | 160/66 |
| 5,340,187 A | 8/1994 | Haddad, Jr. | 296/98 |
| 5,354,113 A | 10/1994 | Pettersson | 296/98 |
| 5,380,058 A | 1/1995 | Short et al. | 296/98 |
| 5,388,882 A * | 2/1995 | Russell et al. | 296/98 |
| 5,482,347 A * | 1/1996 | Clarys et al. | 296/98 |
| 5,547,243 A | 8/1996 | Lamb et al. | 296/98 |
| 6,318,790 B1 * | 11/2001 | Henning | 296/98 |
| 6,338,521 B1 * | 1/2002 | Henning | 296/98 |

(List continued on next page.)

FOREIGN PATENT DOCUMENTS

FR  2 752 787  3/1998

Primary Examiner—Kiran Patel
(74) Attorney, Agent, or Firm—Banner & Witcoff, Ltd.

(57) ABSTRACT

An apparatus for covering an open container of a vehicle includes a pair of arms. Each arm has a first arm member and a second arm member. A first rotatable member is pivotally secured to the first arm member. A second rotatable member is pivotally secured to the first arm member and rigidly secured to the second arm member. A linking member couples the first and second rotatable members to one another. A first actuator is secured to the first arm member, a second actuator is secured to the first rotatable member, and a cover is connected to the second arm members.

42 Claims, 10 Drawing Sheets

U.S. PATENT DOCUMENTS

| | | | |
|---|---|---|---|
| 5,549,347 A | 8/1996 | Anderson | 296/98 |
| 5,573,295 A | 11/1996 | Haddad, Jr. | 296/100 |
| 5,697,663 A | 12/1997 | Chenowth | 296/98 |
| 5,743,700 A | 4/1998 | Wood, Jr. et al. | 414/498 |
| 5,752,735 A * | 5/1998 | Fleming et al. | 296/98 |
| 5,762,002 A | 6/1998 | Dahlin et al. | 105/377 |
| 5,765,901 A | 6/1998 | Wilkens | 296/98 |
| 5,803,528 A * | 9/1998 | Haddad, Jr. | 296/98 |
| 5,823,604 A | 10/1998 | Chenowth | 296/98 |
| 5,829,818 A * | 11/1998 | O'Daniel | 296/98 |
| 5,829,819 A | 11/1998 | Searfoss | 296/98 |
| RE36,135 E * | 3/1999 | O'Brian | 296/98 |
| 5,882,062 A | 3/1999 | Chenowth | 296/98 |
| 5,887,937 A | 3/1999 | Searfoss | 296/122 |
| 5,924,758 A | 7/1999 | Dimmer et al. | 296/98 |
| 5,944,374 A * | 8/1999 | Searfoss | 296/98 |
| 5,988,732 A | 11/1999 | Schouten | 296/181 |
| 6,053,556 A | 4/2000 | Webb | 296/98 |
| 6,089,645 A | 7/2000 | Haddad, Jr. | 296/98 |
| 6,109,680 A | 8/2000 | Horner et al. | 296/98 |
| 6,142,553 A | 11/2000 | Bodecker | 296/98 |
| 6,199,935 B1 | 3/2001 | Waltz et al. | 296/98 |
| 6,206,448 B1 | 3/2001 | Haddad, Jr. | 296/98 |
| 6,220,646 B1 * | 4/2001 | Merino Lamela | 296/98 |
| 6,237,985 B1 * | 5/2001 | O'Brian | 296/98 |
| 6,250,709 B1 | 6/2001 | Haddad, Jr. | 296/98 |
| 6,273,490 B1 * | 8/2001 | Haddad | 296/98 |

* cited by examiner

CONTAINER COVERING APPARATUS

FIELD OF THE INVENTION

This invention relates to an apparatus for covering open containers, and, more particularly, to an apparatus for covering open top truck containers.

BACKGROUND OF THE INVENTION

Large open top containers are commonly used to transport loose materials such as construction debris or refuse to landfills or other dumping locations. These containers are often transported on a roll-off truck that has the capability to pick up and off-load the container at desired locations. The tops of such containers are typically open to facilitate loading. In many places, laws and regulations require the tops of such containers to be covered before they can be transported on public roadways so that material from the container cannot be blown out of the containers. Even where there are no laws regarding covering a load, it is beneficial for the driver to cover the load in order to reduce the possibility of damage to other property from rocks or other debris that might escape from the container. These containers typically have a rectangular top opening. The size of these containers may vary, with many containers ranging from 16 to 24 feet in length and 4 to 8 feet in height. It is common for any one roll-off truck to carry a number of different sizes of these containers.

Placing a tarp or cover on a container manually is both time-consuming and expensive. The need for a covering apparatus to accommodate various container sizes that would automatically deploy the cover or at least simplify and speed up the covering process became apparent some time ago.

Several inventions have been proposed to address the need to cover open top containers during transport. One approach has been to provide a spring-loaded spool, mounted to the front of the truck, that moves up and down on a pedestal to suit the height of the container. The driver can then pull the cover off of the spool out over the container opening like one would pull a window shade. Although this semi-automatic covering method is better than manual covering, it is still difficult and time consuming, and requires the driver to fasten the end of the cover that was pulled off of the spool to the container. Many of the prior art devices that automate the covering process are similar to the semi-automated process described above, but have a pivoting arm secured to the truck or truck body on each side of the container. These arms pull the end of the cover over the container. Sometimes these arms are spring-loaded to pull the cover toward the rear of the container as the cover is unrolled from the motor-controlled roller at the front of the container. Sometimes the roller at the front of the container is spring-loaded to roll the cover up on it, and the arms are controlled by a hydraulic cylinder or other suitable mechanism to pull the cover over the container. Further, some of the prior art devices have a spring-loaded roller with the cover rolled onto it and attached to the arms, with the other end of the cover attached to the truck just behind the cab. As the arms pivot, the spool of material is pulled from front to back over the top of the container, thereby unspooling the material so that it lies over the open top, effectively covering the container.

One of the greatest challenges in the covering mechanisms is to provide the ability to adapt to various container lengths and heights. Some containers have a rear door that is higher than the container sides that makes covering the container even more challenging. One approach to these challenges is to provide for a telescopic arm pivotally attached to either the container itself or the truck that transports the container. U.S. Pat. No. 4,874,196 to Goldstein et al. discloses a container mounted telescopic arm arrangement. Although the apparatus of Goldstein is specific to the container on which it is mounted, the principle can also be applied to truck mounted covering mechanisms like that shown in U.S. Pat. No. 5,803,528 to Haddad, Jr. One disadvantage of the exclusively telescopic approach is that such sliding motion is generally more expensive to fabricate and more difficult to maintain than a pivoting motion in the harsh environments to which these covering mechanisms are subjected. The telescopic arm concept is shown in U.S. Pat. Nos. 5,238,287 and U.S. Pat. No. 5,340,187 to Haddad, Jr. One embodiment shown in U.S. Pat. No. 5,829,818 to O'Daniel also utilizes a telescopic arm to accommodate variations in container height.

A second approach to accommodating the various container sizes has been to provide an arm composed of two pivotally connected sections. This concept is illustrated in U.S. Pat. No. 5,292,169 to O'Brian. The pivotal connections of O'Brian are an improvement in terms of fabrication cost and maintenance, but, like the sliding arms, have other disadvantages enumerated below.

A disadvantage of both of these types of covering mechanisms is illustrated in FIG. 7 of U.S. Pat. No. 5,829,818 to O'Daniel. When hauling a container that is short from front to rear, this type of covering mechanism may require the end of the arm that supports the spool of covering material to hang over the back of the container when the cover is applied. This presents several problems. Firstly, the end of the arm is unsupported during transport of the container, and all of the shock loads or dynamic loads that occur are applied directly to the base of the arm. Further, this could put large loads on the cover itself, potentially causing premature failure. These loads could be significant and could require over design of the base structure, with its accorded additional weight, and/or a reduced operating life of the mechanism. Further, the end of the arm is exposed to potential damage because it is the rearmost point on the truck when the cover is applied. Also, if this mechanism was used to cover a container with a rear door that is higher than the container, the cover would leave a triangular portion open on both sides of the container where refuse could escape from the container.

Another disadvantage of both the sliding and pivoting types is that two separate motions control the roller position, the rotation of the base arm and either the extension or rotation of the outer arm. This is a substantial problem if the rolled up cover is stored between the truck cab and the container. To deploy the cover, the roller must initially move in a substantially vertical line from its stored position in between the cab of the truck and the top of the front wall of the container as the container is being covered. Often the space in between the cab and the container is small and any deviation from the vertical path may result in damage to the covering mechanism, the cab of the truck, or the container. One partial solution to this problem has been to mount the stored spool of covering material at or above the top of the cab of the truck. However, this mounting position necessitates a tall support structure for the spool of covering material that at least partially obstructs the view through the back window of the cab. The obstruction of the rear cab window is also present in most of the prior art concepts. Additionally, a tall support structure potentially prevents adequate coverage of the front edge of the container when the containers are comparatively shallow.

A further disadvantage of the pivoting type of the prior art is that in covering short containers, with the roller placed on the rearmost top edge of the container, the base arm would stick up considerably above the top of the container, increasing the possibility of damage to the covering apparatus from tree limbs as the container is being transported.

A further disadvantage of the prior art is that, in the stowed position, at least portions of the arms are substantially above the bottom of the container. Thus, as the container is rolled on and off the vehicle, components of the container, such as hinges and latches, which are typically positioned at the maximum width of the container, are more likely to hit and damage the covering mechanism.

Another problem with manual covering of a container, and with certain semi-automatic covering systems is the risk of injury. When items in a container project upward beyond the top of the container, the operator may need to climb up on the container and/or load to cover the container, or ensure that the covering is able to extend over the items projecting upward out of the container. The risk lies not only in climbing up high off the ground, but also in the parts of the load that could cut or injure the operator. In some prior art container covering systems, it is difficult for the cover to get over such projecting loads, particularly the types of container covering systems that extend linearly over the container.

It is an object of the present invention to provide a container covering apparatus that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the present invention may be used advantageously to provide a container covering apparatus that can be adapted to cover containers of various sizes, that is simple to operate and reliable.

In accordance with a first aspect, an apparatus for covering an open container of a vehicle includes a pair of arms. Each arm has a first arm member and a second arm member. A first rotatable member is pivotally secured to the first arm member. A second rotatable member is pivotally secured to the first arm member and rigidly secured to the second arm member. A linking member couples the first and second rotatable members to one another. A first actuator is secured to the first arm member, a second actuator is secured to the first rotatable member, and a cover is connected to the second arm members.

In accordance with another aspect, an apparatus for covering an open container of a vehicle includes a pair of arms. Each arm includes a support member having a first end and a second end. A first arm member is pivotally secured at a first end thereof to the support member. A second arm member is pivotally secured at a first end thereof to a second end of the first arm member. A first sprocket is pivotally secured to the first end of the first arm member. A second sprocket is pivotally secured to the second end of the first arm member and rigidly secured to the first end of the second arm member. A continuous chain is wrapped around each of the first and second sprockets. A first actuator is pivotally secured at a first end thereof to the support member and at a second end thereof to the second end of the first arm member. A second actuator is pivotally secured at a first end thereof to the support member and pivotally secured at a second end thereof to the first sprocket. A cover is rolled upon a spool having opposed ends, with each end of the spool supported at a second end of one of the second arm members.

In accordance with yet another aspect, an apparatus for covering an open container of a vehicle includes a pair of arms. Each arm includes a support member. A first arm member is pivotally secured at a first end thereof to the support member. A second arm member is pivotally secured at a first end thereof to a second end of the first arm member. A first rotatable member is pivotally secured to the first end of the first arm member. A second rotatable member is pivotally secured to the second end of the first arm member and pivotally secured to the first end of the second arm member. A linking member couples the first and second rotatable members to one another. A first actuator is pivotally secured at a first end thereof to the support member and at a second end thereof to the second end of the first arm member. A second actuator is pivotally secured at a first end thereof to the support member and pivotally secured at a second end thereof to the first rotatable member. A cover is connected to the second arm members.

In accordance with a further aspect, an apparatus for covering an open container of a vehicle includes a pair of arms, with each arm including a first arm member and a second arm member rotatable greater than 180° with respect to the first arm member. A first rotatable member is pivotally secured to a first end of the first arm member. A second rotatable member is pivotally secured to a second end of the first arm member. A linking member couples the first and second rotatable members to one another. A first actuator is connected to the first arm member and a second actuator is connected to the second arm member. A cover is connected to the second arm members.

In accordance with yet a further aspect, a covering device for covering an open top container supported by a truck frame has an arm assembly on each side of the truck. At least one arm assembly includes a pair of articulated arms coupled to a cover such that movement of at least one of the arms moves the cover between a covering position where the cover overlies the container and a stowage position where the container is uncovered. A pair of disks are coupled by a flaccid member, and one of the arms is fixed to one of the disks such that the one arm pivots about the other arm with movement of the flaccid member to move the cover toward the covering position or the stowage position.

In accordance with another aspect, a process for covering an open top container supported by a truck frame includes the steps of providing a pivoted arm assembly on each side of a truck, the arm assemblies being coupled to a spool supporting a cover; supporting the spool at a front end of the container at a position below the open top of the container; actuating the arm assembly such that the spool is lifted substantially along a vertical plane until the spool is lifted above the open top of the container; and actuating the arm assembly once it is above the open top of the container to move the spool to a rear end of the container so that the cover overlies the open top of the container.

In accordance with yet a further aspect, an apparatus for covering an open container of a vehicle includes a pair of arms, with each arm having a first arm member rotatable in a first plane and a second arm member pivotally connected to the first arm member and rotatable in a second plane laterally offset from the first plane. A cover is connected to the second arm members.

In accordance with still a further aspect, an apparatus for covering an open container of a vehicle includes a pair of arms. Each arm includes a first arm member and a second arm member pivotally connected to the first arm member and having a length greater than a length of the first arm member. A cover is connected to the second arm members.

Substantial advantage is achieved by providing a container covering apparatus. In particular, preferred embodiments of the present invention are able to cover a wide variety of container sizes using an apparatus having a simple, low maintenance construction with low profile design and simple positioning control. Preferred embodiments of the present invention allow a cover to be deployed over a load that extends above a top of a container without an operator needing to climb up on top of the container to ensure the cover can get past the obstructions. Further, preferred embodiments of the present invention provide support for the covering apparatus in its non-deployed condition, and the container itself provides support for a spool of the covering apparatus in its non-deployed condition. Additionally, preferred embodiments of the present invention in their non-deployed position sit low on a vehicle, thereby minimizing the risk of damaging the covering apparatus during loading and unloading of the container. These and additional features and advantages of the invention disclosed here will be further understood from the following detailed disclosure of certain preferred embodiments.

The figures referred to above are not drawn necessarily to scale and should be understood to present a representation of the invention, illustrative of the principles involved. Some features of the container covering apparatus depicted in the drawings have been enlarged or distorted relative to others to facilitate explanation and understanding. The same reference numbers are used in the drawings for similar or identical components and features shown in various alternative embodiments. A container covering apparatus as disclosed herein, will have configurations and components determined, in part, by the intended application and environment in which it is used.

DETAILED DESCRIPTION OF CERTAIN PREFERRED EMBODIMENTS

Figure 1:
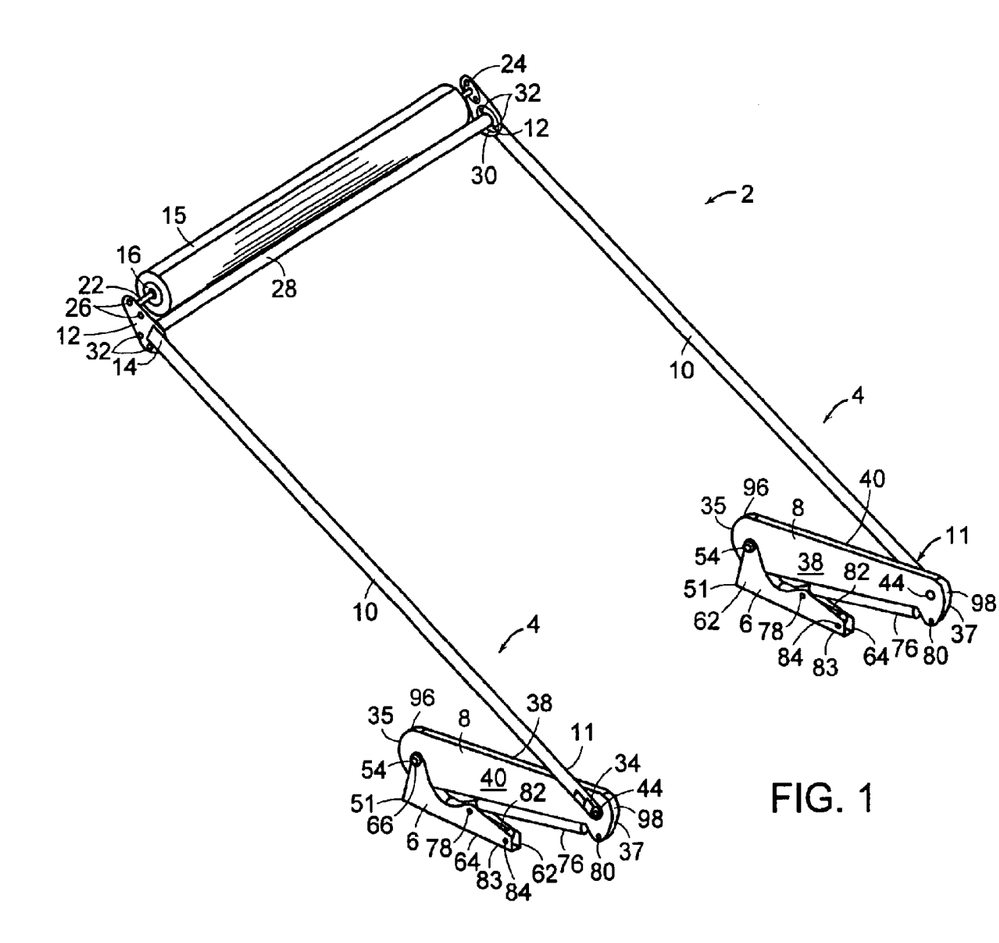
FIG. 1 is a perspective view of a preferred embodiment of a covering apparatus in accordance with the present invention.
Figure 2:
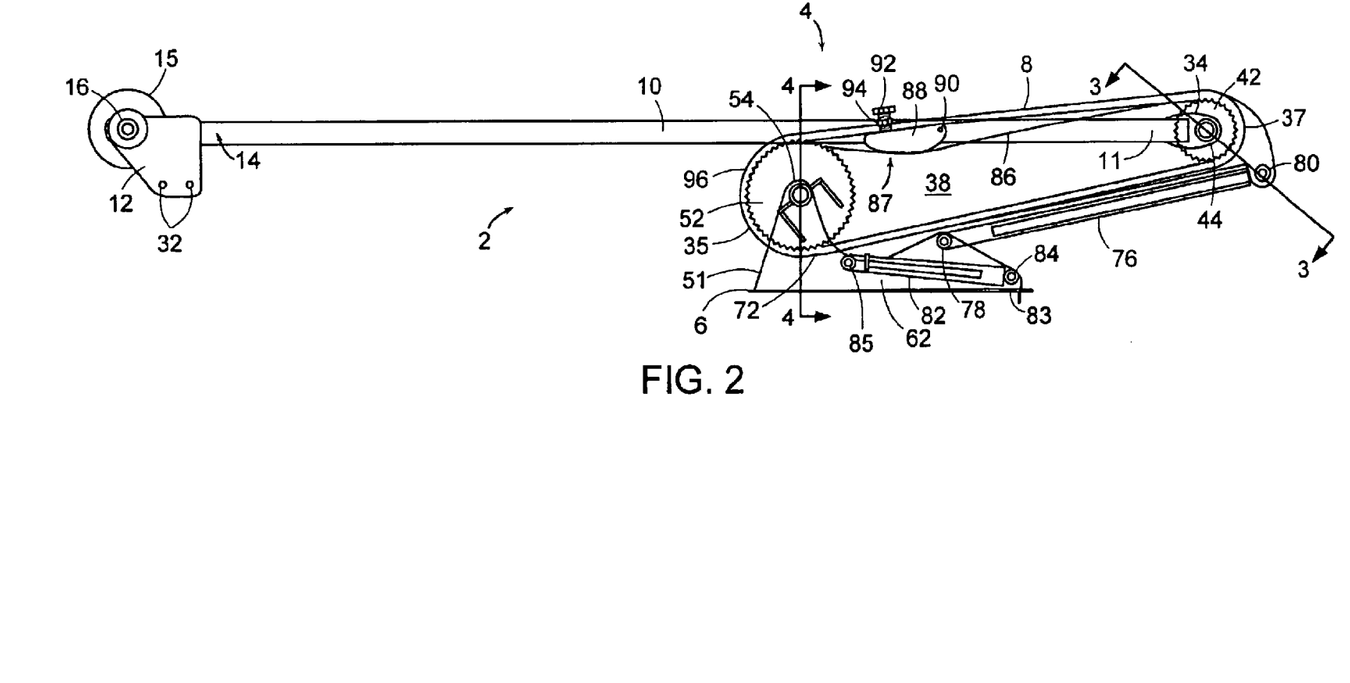
FIG. 2 is a side elevation of the covering apparatus of FIG. 1, shown with one wall of the support member and one wall of the first arm member removed.

A preferred embodiment of a container covering apparatus 2 for a truck 3, or other vehicle, in accordance with the present invention is shown in FIGS. 1–2. The embodiments described herein show a roll-off container on a truck, however, it is to be appreciated that the use of the container covering apparatus of the present invention to cover other types of open containers on trucks, e.g., dump trucks, is considered to be within the scope of the invention. Covering apparatus 2 has a pair of jointed arms 4 separated by a preselected lateral distance. Arms 4 are preferably separated by a distance sufficient to clear a container on truck 3 as arms 4 move along their path of travel. Each arm 4 may include a support member such as a mounting bracket 6, a first arm member 8, and a second arm member 10. In certain preferred embodiments, covering apparatus 2 may not have a support member such as mounting bracket 6, and in such an embodiment, covering apparatus 2 would be secured directly to truck 3. In a preferred embodiment, second arm member 10 is longer than first arm member 8. In certain preferred embodiments, the length of first arm member 8 and second arm member 10 can be varied in order to accommodate containers of different lengths.

In certain preferred embodiments, second arm member 10 is a tubular member, although it is to be appreciated that other configurations of second arm member 10 are considered to be within the scope of the invention. Second arm member 10 has a first end 11 and a second end 14. A plate 12 is secured at second end 14 of each second arm member 10. A cover 15 is wound about a spool 16, each end of which is pivotally secured to a corresponding plate 12. In certain preferred embodiments, a rod 22 extends through spool 16, with a plate 24 secured at each end of rod 22. Plates 24 may be secured by bolts 26, or other suitable fasteners to plate 12.

In certain preferred embodiments, spool 16 could be rotatably secured to truck 3, with cover 15 being pulled from spool 16 as it is deployed over a container on the truck, similar to the action of a window shade being pulled into its deployed condition.

In preferred embodiments, cover 15 is formed of a flexible material such as polyester, polypropylene, vinyl, canvas, or other material suitable for retaining material within a container. Other suitable materials for cover 15 will become readily apparent to those skilled in the art, given the benefit of this disclosure. Spool 16 is preferably spring loaded such that cover 15 is kept in tension. The manner of spring loading a spool is well known in the art and need not be described here in detail.

In certain preferred embodiments, a rigid member such as a rod 28 extends between plates 12. Plates 30 at respective ends of rod 28 are secured to plates 12 by bolts 32 or other suitable fasteners. Rod 28 helps keep both second arm members 10 in synchronization as they travel, and also restrains undesirable side-to-side motion of second arm members 10. In certain embodiments, the synchronization is all done hydraulically, as will be described later. In such an embodiment, a large center tube, supporting spool 16, is used to provide side-to-side rigidity, and, therefore, rod 28 would not be needed. In certain preferred embodiments, both spool 16 and rod 28 can advantageously be disassembled from plates 16 and extension sections 10, respectively, for shipping.

Figure 3:
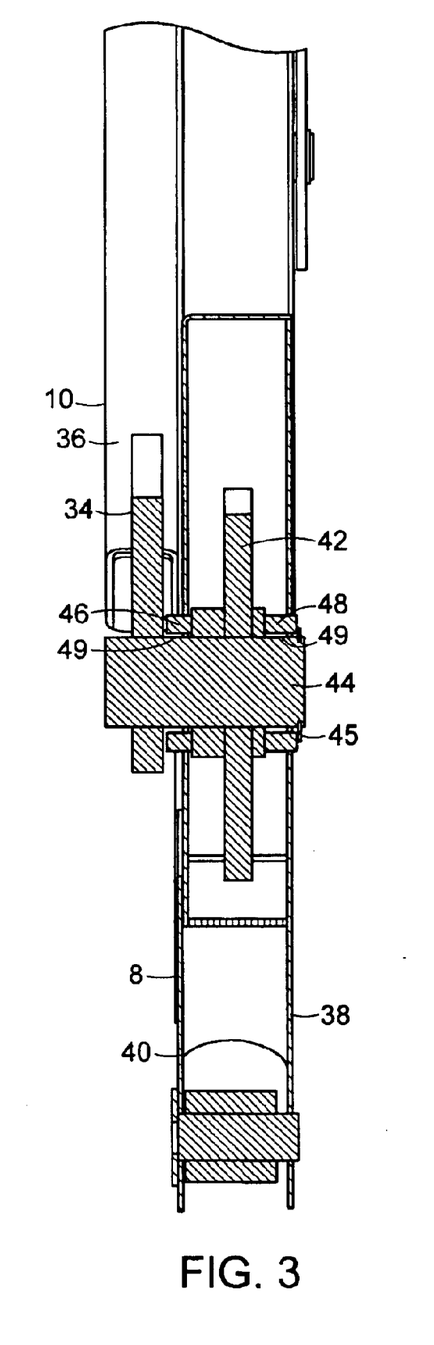
FIG. 3 is a section view of the covering apparatus of FIG. 1, taken along line 3—3 of FIG. 2.

A plate 34 may be secured to first end 11 of each second arm member 10. As can be seen in FIGS. 2 & 3, each first arm member 8 has a first end 35 and a second end 37, and may be formed of an inner wall 38 and an outer wall 40. Second end 37 of first member 6 is pivotally secured to first end 11 of second arm member 10 by a pin 44. First and second rotatable members, such as disks or sprockets 52, 42 are positioned between walls 38 and 40. Second sprocket 42 is pivotally secured to second end 37 of first arm member 8 by pin 44 that extends through and is keyed to second sprocket 42. Second sprocket 42 is rigidly secured to plate 34. A retaining ring 45 holds pin 44 axially on first arm member 8. Second sprocket 42 is seated between an outer bushing 46 and an inner bushing 48, which are secured to outer wall 40 and inner wall 38, respectively, by welding or other suitable means. Bearings 49 may also be contained within inner bushing 48 and outer bushing 46 to reduce fiction and wear. Thus, it can be seen that first arm member 8 will rotate in a plane laterally offset from a plane of rotation of second arm member 10.

Figure 4:
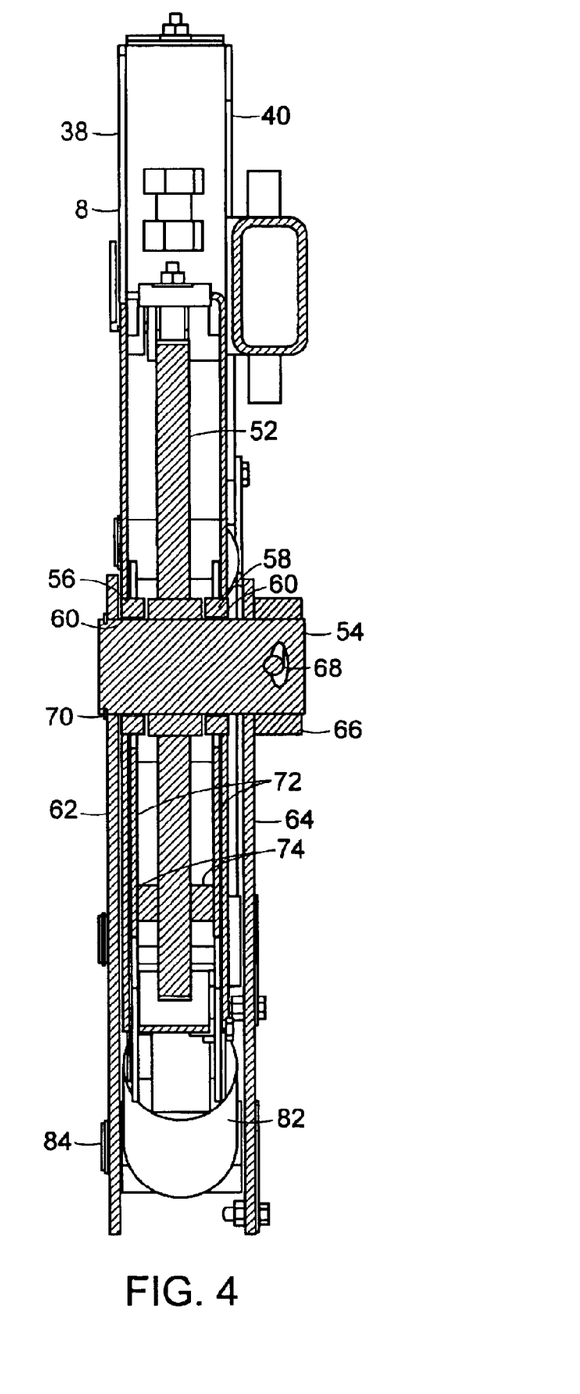
FIG. 4 is a section view of the covering apparatus of FIG. 1, taken along line 4—4 of FIG. 2.

As can be seen in FIGS. 2, 4, first arm member 8 is pivotally mounted at its first end 35 to a first end 51 of mounting member 6 about a pin 54. First sprocket 52 is pivotally secured to first arm member 8 by pin 54 that extends through first sprocket 52. First sprocket 52 is seated between an inner bushing 56 and an outer bushing 58, which are secured to inner wall 38 and outer wall 40, respectively, by welding or other suitable means. Bearings 60 may also be contained within bushings 56, 58 to reduce fiction and wear. Mounting member 6 may be formed of an inner wall 62 and an outer wall 64, which also receive pin 54. A ring 66 surrounds the outer end of pin 54, and is secured to pin 54 by a bolt 68, to prevent pin 54 from rotating and moving axially. A retaining ring 70 at the other end of pin 54 restrains outer wall 64 from moving axially with respect to inner wall 62. Sprocket ears 72 are affixed to each side of first sprocket 52, such as by welding, and may be spaced apart from first sprocket 52 by means of spacers 74. Alternative structures for rigidly connecting first sprocket 52 to sprocket ears 72 are considered to be within the scope of the invention, e.g., by keying pin 54 to first sprocket 52 and welding sprocket ears 72 to pin 54. Other alternative structures will become readily apparent to those skilled in the art, given the benefit of this disclosure.

A first actuator 76 connects mounting member 6 to first arm member 8. A first end of first actuator 76 is pivotally secured to a central portion of mounting member 6 by a pin 78. A second end of first actuator 76 is pivotally secured to second end 37 of first arm member 8 by a pin 80. Although the first actuator 76 of the preferred embodiment is depicted as a hydraulic cylinder, it is understood that rotary actuators or other linear actuators could also be used.

A second actuator 82 connects mounting member 6 to first sprocket 52. A first end of second actuator 82 is pivotally secured by a pin 84 to second end 83 of mounting member 6. Pin 84 extends through second actuator 82, and inner and outer walls 62, 64 of mounting member 6. A pin 85 extends through a second end of second actuator 82 and sprocket ears 72, thereby pivotally securing a second end of second actuator 82 to first sprocket 52. In the illustrated embodiment, second actuator 82 is depicted as a hydraulic cylinder. However, it is understood that rotary actuators or other linear actuators could also be used.

In certain preferred embodiments, a flaccid or linking member such as a continuous loop of chain 86 rotationally links or couples first sprocket 52 and second sprocket 42 to one another. The coupling of second sprocket 42 and first sprocket 52 via chain 86 allows second arm member 10 to pivot or rotate about second end 37 of first arm member 8 well in excess of 180°, which allows great freedom of movement of covering apparatus 2. Further, the fact that first arm member 8 and second arm member 10 rotate in planes that are offset from one another allows them to rotate with respect to each other an amount greater than that possible if they were coplanar. In a preferred embodiment, first sprocket 52 is larger than second sprocket 42. Since first sprocket 52 rotates less than 180° in certain preferred embodiments, first sprocket 52 and chain 86 could be replaced with a cable, leaf chain or the like connected to a pulley. Second sprocket 42 and chain 86 in certain other preferred embodiments could be replaced with two cables, leaf chains, or the like, wrapping around a first pulley in opposite directions and affixed to that pulley at their ends, and around a second pulley and affixed to the second pulley at their other ends.

Figure 11:
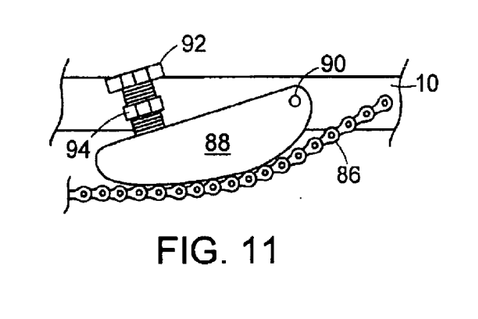
FIG. 11 is a side elevation of the tensioning device of FIG. 2.

The continuous loop of chain 86 can be regulated by a tensioning device 87 including a cam 88, as seen in FIGS. 2 and 11, over which chain 86 passes. One end of cam 88 is pivotally connected by a pin 90 to first arm member 8. Slack in chain 86 can be regulated by way of an adjustment member such as a bolt 92, which is turned into a nut 94 that is affixed to first arm member 8. Bolt 92 pushes against a second end of cam 88, rotating cam 88 about pin 90. Thus, as bolt 92 is tightened, cam 88 pushes against chain 86, thereby tightening chain 86 and removing excess slack.

As shown in FIGS. 1, 2, a cover 96 may be fastened to first end 35 of first arm member 8 to cover first sprocket 52. Similarly, a cover 98 may be fastened to second end 37 of first arm member 8 to cover second sprocket 42.

Figure 5:
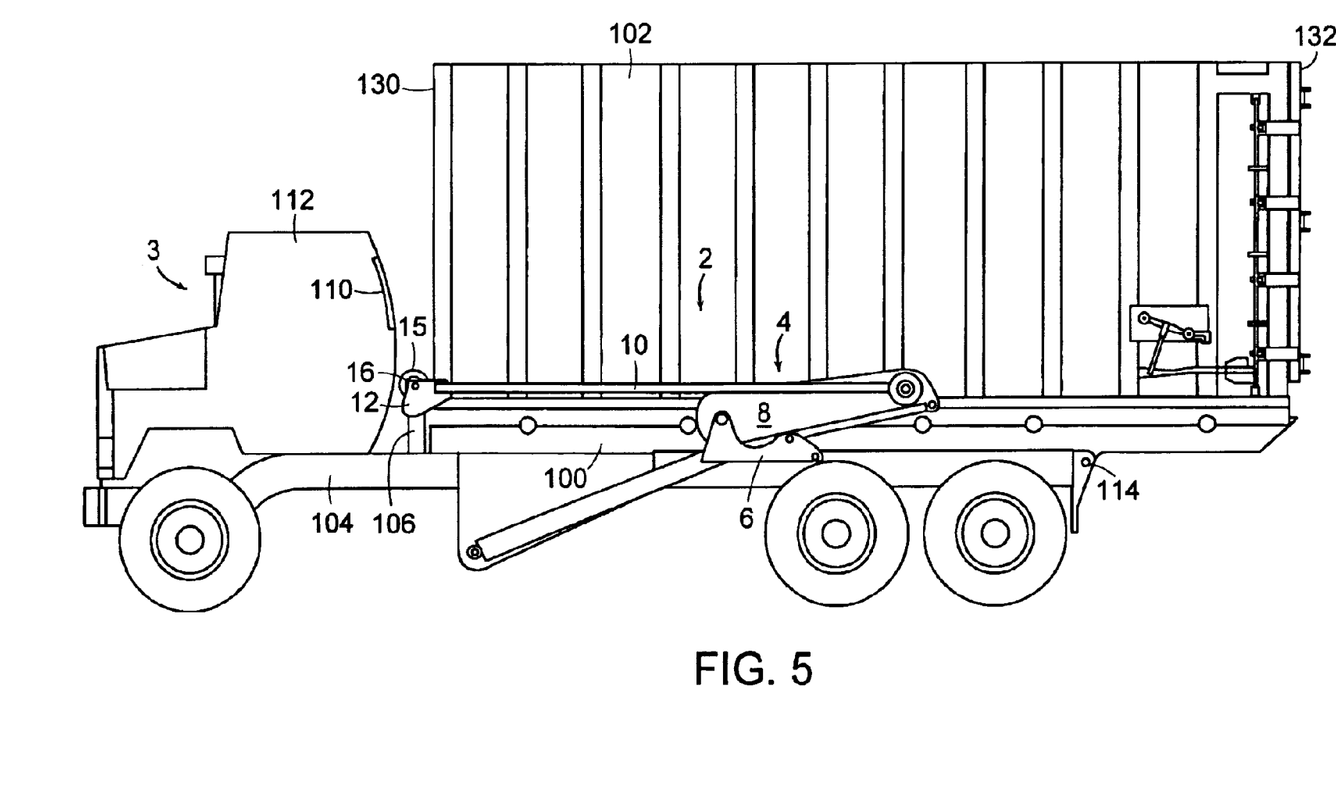
FIG. 5 is a side elevation of the covering apparatus of FIG. 1, shown in its non-deployed condition on a truck with an open top container loaded for transport.

Covering apparatus 2 is seen in FIG. 5 mounted to a tilting platform 100 of truck 3. In the illustrated embodiment, tilting platform 100 allows for loading and unloading of a container 102. Mounting member 6 may be directly mounted to a chassis 104 of truck 3, by bolting, riveting or otherwise suitably fastening a beam structure (not shown) to chassis 104 and mounting member 6. In other preferred embodiments, mounting member 6 may be mounted directly to tilting platform 100 by welding, bolts or any other suitable fastener, in which case covering apparatus 2 will be raised and lowered with tilting platform 100 and container 102.

In FIGS. 2, 5, covering apparatus 2 is shown in its closed, stowed or non-deployed condition. In this condition, second arm member 10 is substantially horizontal to provide a low profile appearance. In such a position, tree limbs and other low hanging objects on a roadway are less likely to damage covering apparatus 2, not only because it is low and substantially horizontal, but also because at this height a driver is more likely avoid potential damage to the covering apparatus 2, since it can be seen in the rear view mirrors and through a rear window 110 of a cab 112 of truck 3.

Spool 16 may be supported in its non-deployed condition on a pedestal 106, as seen in FIG. 5. In such an embodiment, one end of cover 15 may be secured directly to pedestal 106 or to a transverse beam 108, seen in FIG. 7, which extends from pedestal 106. In other embodiments, spool 16 could rest directly on chassis 104 of truck 3, with cover 15 secured to a beam transversely mounted to chassis 104, or directly to chassis 104. When no container 102 is loaded on truck 3, spool 16 rests on pedestal 106 well below the height of rear window 110 of truck 3 so that the driver has a clear view through rear window 110 unencumbered by spool 16 or support pedestal 106. In some cases, particularly when retrofitting a truck, there may not be room between cab 112 and tilting platform 100 to mount spool 16. In such a case, pedestal 106 may be lengthened, and spool 16 mounted in the area above window 110. There is extra room available in that area since tilting platform 100 rotates away from cab 112 about a rear pivot point 114 during dumping. If spool 16 is mounted in a higher position, a stop is inserted in the base ends of first extension actuators 76 to shorten their stroke.

Figure 6:
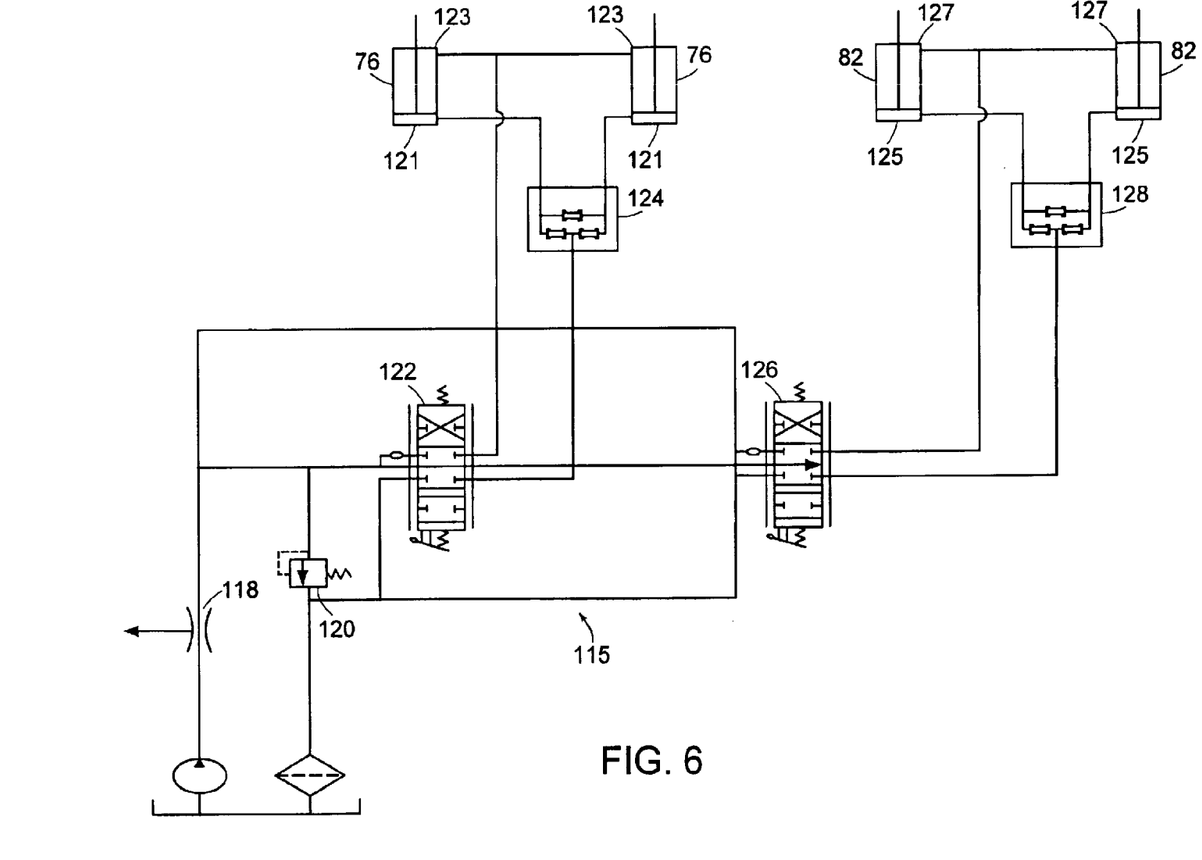
FIG. 6 is a schematic view of a hydraulic circuit for actuation of the covering apparatus of FIG. 1.

In a preferred embodiment, covering apparatus 2 is controlled by a hydraulic system 115, as seen in FIG. 6. A pump 116 provides hydraulic power. Pump 116 can either be driven by the engine of truck 3, or it may be a stand-alone electrically driven pump. If pump 116 is the same pump used to operate the standard hydraulic systems of truck 3, a flow divider 118 may be used to limit the flow to the covering apparatus 2, e.g., to approximately 3–5 gallons per minute. A relief valve 120 limits the maximum pressure provided to first and second actuators 76, 82. A first directional control valve 122 controls the flow of fluid to first actuators 76. When first directional control valve 122 is actuated in one direction, pressurized fluid is introduced to a base end 121 of first actuators 76 in order to extend them. When actuated in the other direction, pressurized fluid is introduced into an opposed rod end 123 of first actuators 76, retracting them. A divider-combiner 124 divides the fluid evenly into each of first actuators 76 to keep them synchronized when they are extending. When first actuators 76 are retracting, divider-combiner 124 combines fluid from first actuators 76 evenly to keep them synchronized. If first actuators 76 should get out of synchronization, divider-combiner 124 will allow some fluid to pass from one side to the other when only one of the first actuators 76 is at the end of its stroke until such time as they are both at the end of their stroke. In a like manner, a second directional control valve 126 controls the flow of fluid to a base end 125 and a rod end 127 of second actuators 82 to correspondingly extend and retract second actuators 82. Another divider-combiner 128 operates, in a like manner as described above with respect to divider-combiner 124, to synchronize second actuators 82.

Figure 7:
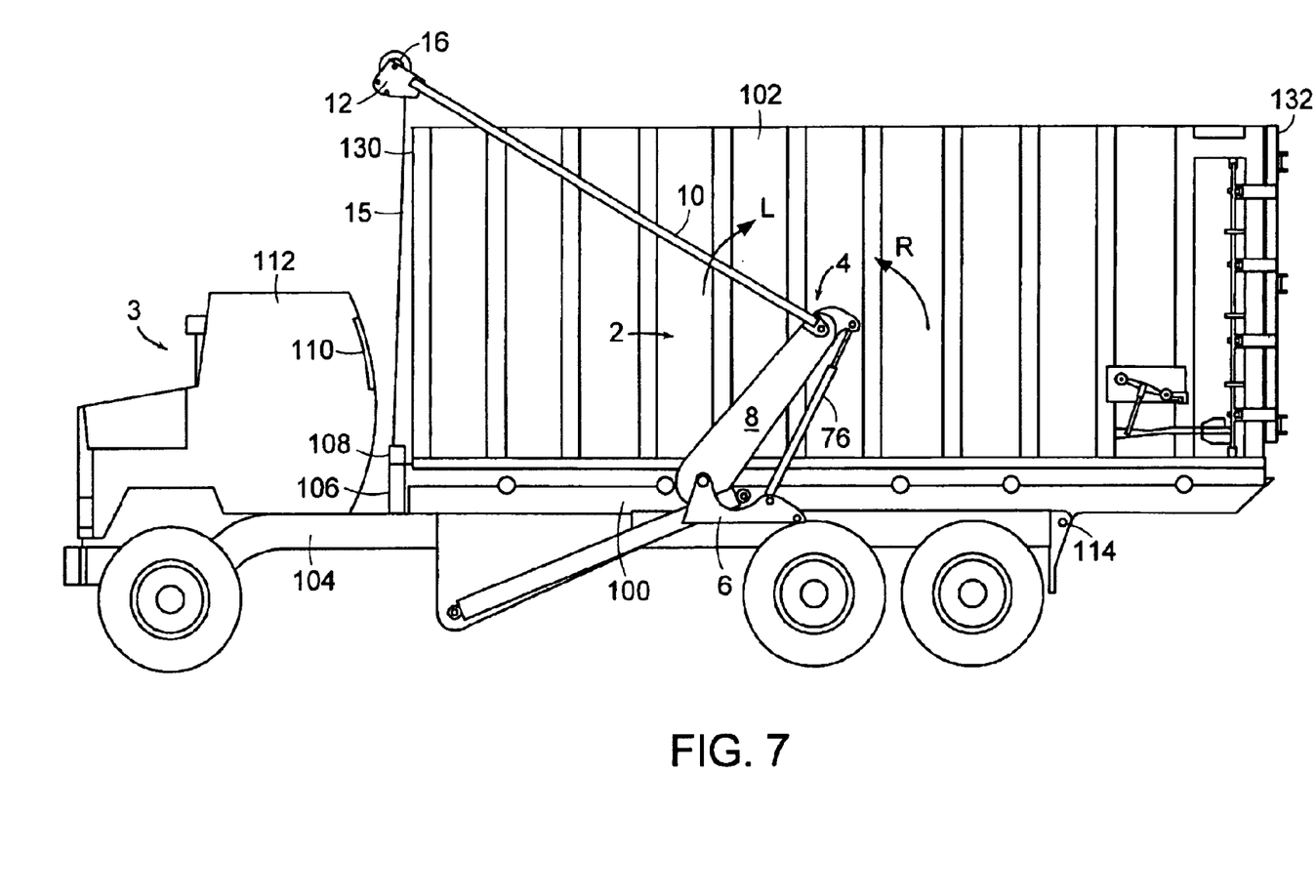
FIG. 7 is a side elevation of the covering apparatus of FIG. 1, shown in the initial phase of covering an open top container.

With open top container 102 on tilting platform 100, as seen in FIG. 7, cover 15 begins to move from its stowed position to its deployed position. An operator initially actuates first directional control valve 122 such that first actuators 76 extend. As first actuators 76 extend, first arm member 8 rotates towards the cab 112, counter clockwise in the direction of arrow R as seen in FIG. 7. Second sprockets 52 do not rotate since they are secured to second actuators 82, so as first arm member 8 rotates, it rotates with respect to first sprocket 52. As first arm member 8 rotates, chain 86 is wrapped onto one side of first sprocket 52 (the bottom side as illustrated in FIG. 2), and off of the other (the top side as seen in FIG. 2). The rotation of first arm member 8 relative to first sprocket 52 and the wrapping and unwrapping of chain 86 about first sprocket 52 causes second sprocket 42 to also be rotated relative to the first arm member 8. The amount of rotation in degrees of second sprocket 42 with respect to first arm member 8 is calculated by multiplying the rotation in degrees of first arm member 8 times the pitch diameter of first sprocket 52 divided by the pitch diameter of second sprocket 42. It may also be calculated by multiplying the rotation in degrees of first arm member 8 times the number of teeth on first sprocket 52 divided by the number of teeth on second sprocket 42. By choosing this ratio appropriately, the path of spool 16 can be made to move almost vertically from its stowed position along a front wall 130 of container 102 to a point at the top front wall 130. This is shown as the path from point A to point B in FIG. 9. The approximate position of covering apparatus 2 after moving vertically along a front wall 130 to a top of container 102 is shown in FIG. 7. Thus, the positioning of spool 16 at the front edge of container 102 is advantageously accomplished without having to jockey two sets of actuators. As spool 16 moves upwardly, cover 15 unwinds from spool 16 so that it extends from beam 108 to the top of container 102 along front wall 130. In a preferred embodiment, cover 15 unwinds from the bottom of spool 16 as it travels.

Figure 8:
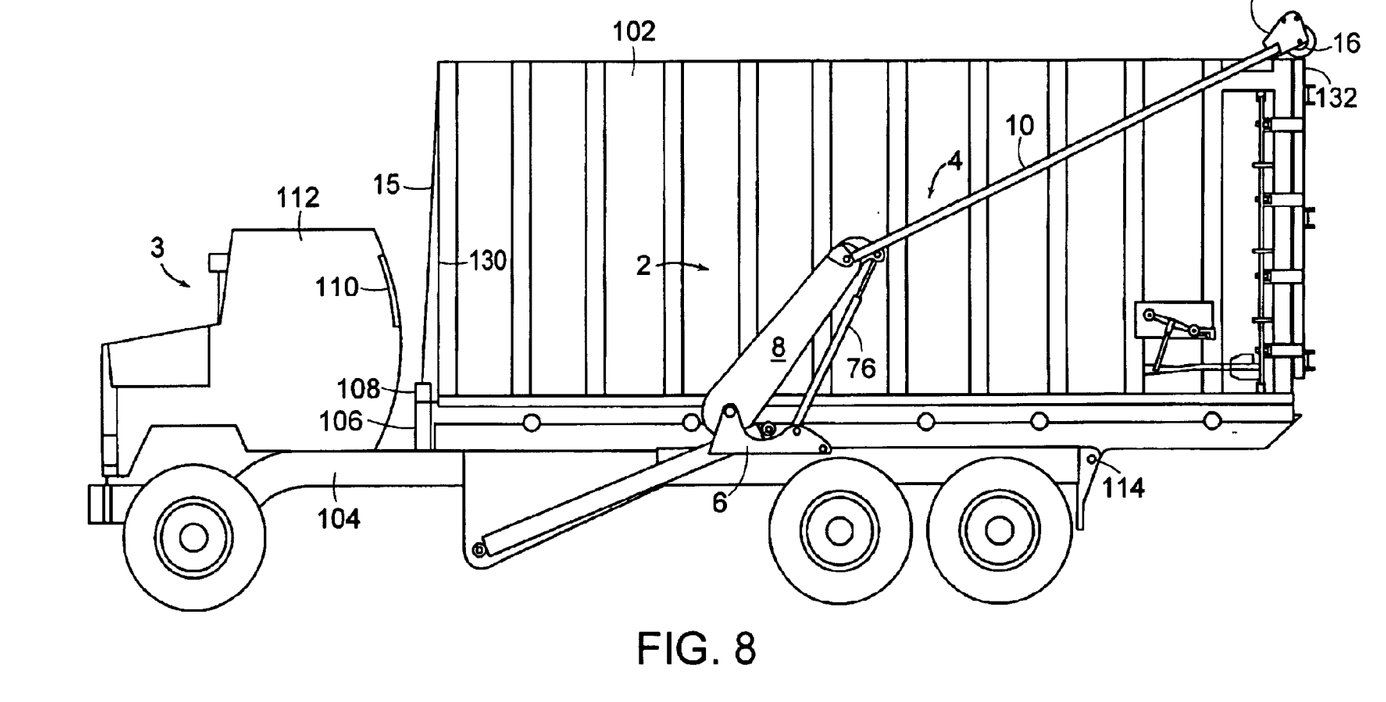
FIG. 8 is a side elevation of the covering apparatus of FIG. 1, shown with its cover of flexible material in place on an open top container.

With spool 16 positioned at the top of front wall 130 as shown in FIG. 7, second directional control valve 126 is then actuated such that second actuators 82 extend. Since second actuators 82 are secured to second sprockets 52 by way of sprocket ears 72, extending second actuators 82 rotates second sprockets 52 clockwise as seen in FIG. 2, which moves chain 86 in a clockwise direction, thereby rotating second sprocket 42 in a clockwise direction. This rotation of second sprocket 42 rotates second arm member 10 clockwise in the direction of arrow L, as seen in FIG. 7, toward the rear of truck 3. Consequently, as second arm member 10 rotates, spool 16 spins and further unwinds cover 15 until spool 16 reaches the rear of container 102 such that cover 15 in its deployed position covers the entire top of container 102, as seen in FIG. 8. In a preferred embodiment, spool 16 rests on the top of container 102 in the deployed position, providing support for arms 4 of covering apparatus 2. The path that spool 16 travels from the front to the rear of container 102 as it deploys cover 15 is shown as path B–C–D in FIG. 9.

In preferred embodiments, first arm member 8 is shorter than second arm member 10 such that when cover 15 is deployed across the top of container 102, the pivotal joint between first arm member 8 and second arm member 10, that is, where pin 44 connects second end 37 of first arm member 8 and first end 11 of second arm member 10, does not extend above the top of container 102, as seen in FIG. 8.

The amount of rotation of second arm member 10 during its travel is dependent on the ratio of the diameter of first sprocket 52 to the diameter of second sprocket 42. Thus, in an embodiment where first sprocket 52 has a diameter twice that of second sprocket 42, for each degree of rotation that second actuator 82 drives sprocket ears 72 and first arm member 8, second arm member 10 moves through two degrees of rotation.

Figure 9:
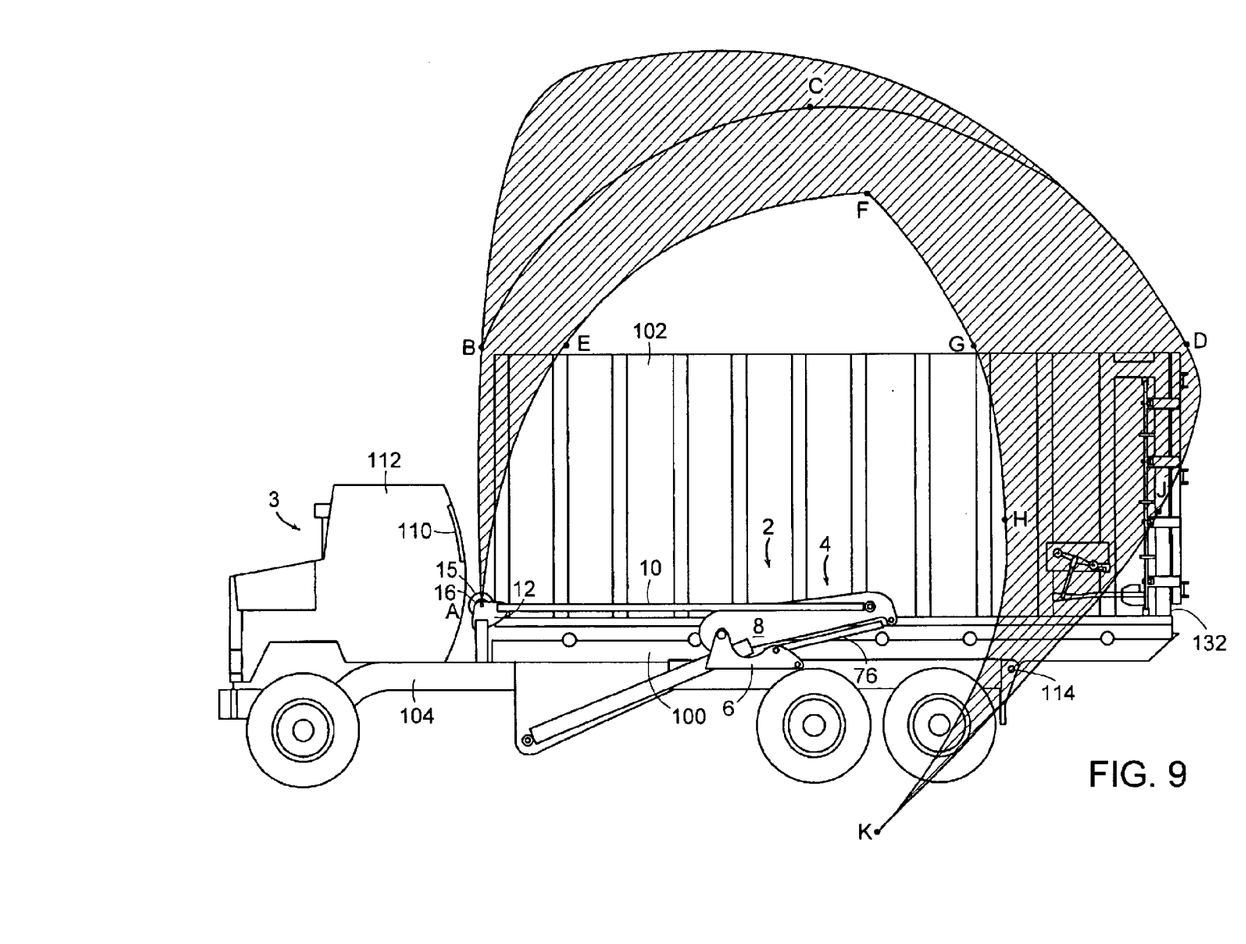
FIG. 9 is a side elevation of the covering apparatus of FIG. 1, showing the envelope where the spool supporting the cover may travel.

Under certain conditions, such as in high winds, an operator can use a different method than that described above to extend cover 15 over container 102, in order to keep cover 15 as low as possible while moving it back over container 102. The operator moves the spool 16 from its stowed condition to the top of front wall 130, that is, from point A to point B as seen in FIG. 9, solely by activating first directional control valve 122 as described above with respect to FIG. 7. Spool 16 is then moved from point B to point E by operating first directional control valve 122 and second directional control valve 126 simultaneously. Spool 16 is then moved from point E to point F by operating only second directional control valve 126, from point F to point G by operating only first directional control valve 122, and from point G to point D by operating first directional control valve 122 and second directional control valve 126 simultaneously.

Figure 10:
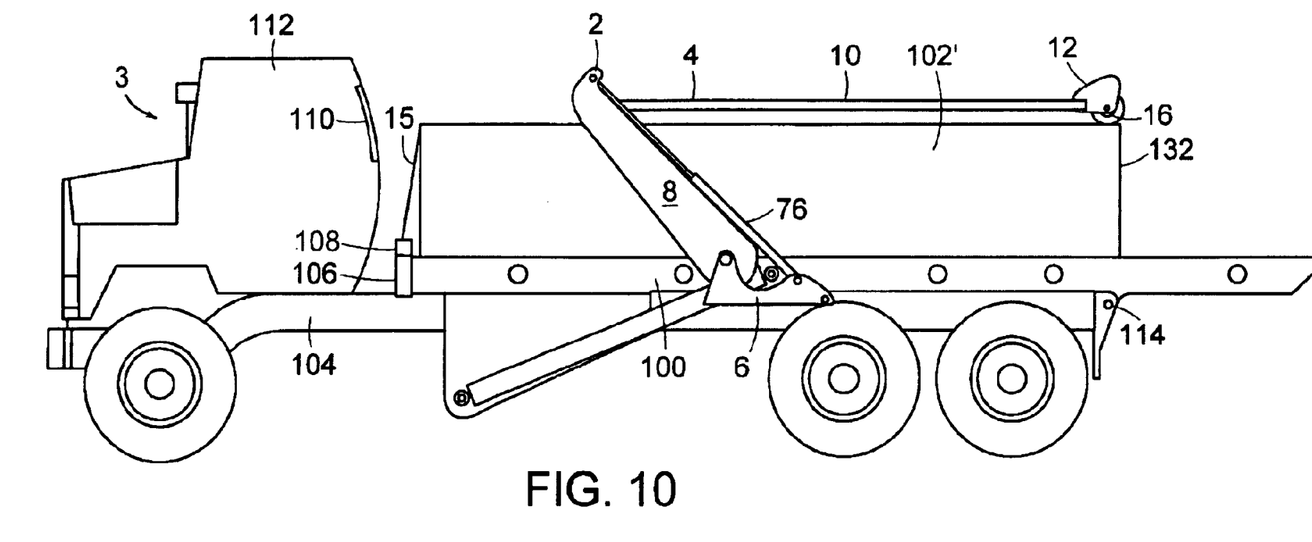
FIG. 10 is a side elevation of the covering apparatus of FIG. 1, shown in a deployed position on a smaller container than that illustrated in FIG. 7.

Spool 16 can be moved along the path from point G to point H to allow shorter containers, e.g., containers approximately 18 feet long, to be covered regardless of their height. The position of the covering apparatus 2 covering a short container 102' is shown in FIG. 10. It is to be appreciated that in certain preferred embodiments, first arm member 8 and second arm member 10 can be shortened as noted above, allowing even shorter containers to be effectively covered by covering apparatus 2. Shortening second arm member 10 and mounting first arm member 8 further forward also allows shorter containers to be covered.

Moving spool 16 along the path from point D to point J allows longer containers, e.g., containers approximately 24 feet long that are typically taller, to be covered. Being able to place the spool 16 anywhere in the area defined by points DJHG in FIG. 9, allows containers between 18 and 24 feet long and most any typical height to be covered. As seen in FIG. 9, the crosshatched area within a path defined by points A–B–D–J–K–H–G–F–E–A shows where spool 16 can travel.

Returning spool 16 and cover 15 to its stowed position is accomplished in one of three ways. The first may be used when an operator desires to keep the cover as close to the container as possible, such as in high winds, and is simply the reverse order of the steps taken to deploy cover 15 in a high wind situation. First and second directional control valves 122, 126 can be operated to follow a path from point D to point G, from point G to point F, from point F to point E, from point E to point B, and from point B to point A.

The second way is to start by rotating first arm member 8 to a forward position with respect to truck 3. On certain containers, first arm member 8 will be in this position already. Second directional control valve 126 is then actuated to retract second actuators 82 until they come fully to the end of their strokes. This will move spool 16 to a forward position above front wall 130 of container 102. First directional control valve 122 is then actuated to retract first actuators 76, which rotates first arm member 8 toward the rear of truck 3. The linked motion of first arm member 8 and second arm member 10, as previously described, causes spool 16 to follow an almost vertical path down between cab 112 of truck 3 and front wall 130 of container 102 until the first and second actuators 76, 82 are fully retracted and have synchronized and spool 16 is resting on pedestal 106.

The third way of returning spool 16 to its stowed position can be used if there is no container 102 on the truck 3. In this situation, both first directional control valve 122 and second directional control valve 126 are actuated, either individually or simultaneously, until each of first and second actuators 76, 82 are fully retracted. Spool 16 will thus simply move to its stowed position on pedestal 106.

Preferred embodiments of the present invention have the ability to cover a wide variety of container sizes as shown in FIGS. 8–10, without hanging spool 16 past the top of rear wall 132 of container 102. In addition, the rotation of first arm member 8 creates the effect of pivoting second arm member 10 from different places fore and aft along the side of container 102 to accommodate different container lengths.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An apparatus for covering an open container of a vehicle comprising:
    a pair of arms, each arm comprising
        a first arm member;
        a second arm member;
        a first rotatable member pivotally secured to the first arm member;
        a second rotatable member pivotally secured to the first arm member and rigidly secured to the second arm member;
        a linking member coupling the first and second rotatable members;
        a first actuator secured to the first arm member; and
        a second actuator secured to the first rotatable member; and
    a cover connected to the second arm members.

2. The apparatus for covering an open container of claim 1, wherein the first and second rotatable members are sprockets.

3. The apparatus for covering an open container of claim 2, wherein a diameter of the first sprocket is larger than a diameter of the second sprocket.

4. The apparatus for covering an open container of claim 2, wherein a diameter of the first sprocket is approximately twice as large as a diameter of the second sprocket.

5. The apparatus for covering an open container of claim 2, wherein the linking member is a continuous chain wrapped around each of the first and second sprockets.

6. The apparatus for covering an open container of claim 5, further comprising a tensioning member to adjust slack in the chain.

7. The apparatus for covering an open container of claim 6, wherein the tensioning member comprises a cam pivotally attached at one end to the first arm member and engaging the chain.

8. The apparatus for covering an open container of claim 1, wherein the first arm member comprises a pair of opposed walls.

9. The apparatus for covering an open container of claim 1, wherein each arm further comprises a support member, each first arm being pivotally secured to a corresponding support member.

10. The apparatus for covering an open container of claim 9, wherein the support member comprises a pair of opposed walls.

11. The apparatus for covering an open container of claim 1, wherein the second arm member is longer than the first arm member.

12. The apparatus for covering an open container of claim 1, wherein the first actuator is a hydraulic cylinder.

13. The apparatus for covering an open container of claim 1, wherein the second actuator is a hydraulic cylinder.

14. The apparatus for covering an open container of claim 1, wherein the cover is formed of a flexible material.

15. The apparatus for covering an open container of claim 1, wherein the cover is rolled upon a spool supported by the second arm members.

16. The apparatus for covering an open container of claim 15, wherein the second arm member is configured to be positioned below a top of the spool when the covering apparatus is in a deployed position on a vehicle.

17. The apparatus for covering an open container of claim 1, wherein the first arm is pivotally secured to a first end of the support member, the first actuator is pivotally secured to a central portion of the support member, and the second actuator is pivotally secured to a second end of the support member.

18. The apparatus for covering an open container of claim 1, further comprising a rigid member rigidly connected at a first end thereof to a second end of one of the second arm members and at a second end thereof to a second end of the other of the second arm members.

19. The apparatus for covering an open container of claim 1, wherein the arms are configured such that the second arm members extend substantially horizontally in a non-deployed position.

20. The apparatus for covering an open container of claim 1, wherein the arm members each have a first end and a second end, each said first arm member being pivotally secured at its first end to a support member, and each second arm member being pivotally secured at its first end to the second end of the first arm member;

the first rotatable member being pivotally secured to the first end of the first arm member;

the second rotatable member being pivotally secured to the second end of the first arm member and rigidly secured to the first end of the second arm member;

the first actuator being pivotally secured at a first end thereof to the support member and at a second end thereof to the second end of the first arm member; and the second actuator pivotally secured at a first end thereof to the support member and pivotally secured at a second end to the first rotatable member.

21. The apparatus for covering an open container of claim 1, further comprising a pedestal to which a free end of the cover is secured.

22. The apparatus for covering an open container of claim 1, wherein the first arm member and second arm member are positioned below the spool when the covering apparatus is in a deployed position.

23. A process for covering an open top container supported by a vehicle comprising:

providing a cover attached between ends of pivoted arm structures with one provided to each side of the container, actuating the pivoted arm structures to lift the cover from a stowed position forward of the container and below the open top substantially along a vertical plane until the cover at least reaches the open top of the container; and actuating the arm assembly to move the cover to a rear end of the container so that the cover overlies the open top of the container.

24. A process in accordance with claim 23 in which each provided arm structure includes at least one linear actuator, wherein the lifting of the cover substantially along the vertical plane is accomplished by operating only one linear actuator in each arm assembly.

25. An apparatus for covering an open container of a vehicle comprising:

a cover movable between an extended position where the cover overlies the container and a stowed position where the container is open;

an arm assembly coupled to the cover to move the cover between the extended and stowed positions, the arm assembly including a first arm member and a second arm member movably coupled together, the first arm member being adapted for attachment to a vehicle and the second arm member being attached to the cover;

an actuator coupled the second arm member for moving the second arm member relative to the first arm member; and a linking assembly coupled to the first and second arm members to passively move the first arm member when the second arm member is moved by the actuator.

26. The apparatus of claim 25 wherein one said first arm member, one said second arm member, one said actuator and one said linking assembly is provided to each side of the container.

27. The apparatus of claim 26 wherein each said linking assembly includes a first sprocket fixed to the second arm member, a second sprocket, and a chain wrapped about each said sprocket.

28. The apparatus of claim 27 wherein each said first arm member, said second arm member and said first sprocket each rotate about a first pivot axis, and each said first arm member and said second sprocket each rotate about a second pivot axis.

29. The apparatus of claim 28 wherein each linking assembly further includes an actuator connected to the second sprocket for selectively rotating the second sprocket to adjust the rates at which the first and second arm members move.

30. The apparatus of claim 25 further comprising a second actuator coupled to the linking assembly to selective adjust the rates at which the first and second arms move.

31. The apparatus of claim 25 wherein the linking assembly includes a first component secured to the second arm member so as to move with the second arm member, a second component secured to first arm member, and a linking member coupling the first component with the second component.

32. The apparatus of claim 31 wherein each of the first and second components is a disk member, and the linking member is a flaccid member wrapped about the disk members.

33. The apparatus of claim 31 wherein each of the first and second components are sprockets and the linking member is a chain.

34. The apparatus of claim 31 wherein the first arm member includes a first end portion attached to the second end portion and a second end portion adapted for attachment to the vehicle, and wherein the first component is rotatably attached to the first end portion of the first arm member and the second component is rotatably attached to the second end portion.

35. The apparatus of claim 31 wherein the first arm member, the second arm member and the first component each rotate about a first pivot axis.

36. The apparatus of claim 35 wherein the first arm and the second component each rotate about a second pivot axis.

37. The apparatus of claim 25 wherein the linking assembly passively moves the first arm member at a predetermined rate upon movement of the second arm member by the first actuator so that the cover moves substantially along vertical plane forward of the container.

38. The apparatus of claim 37 wherein the linking assembly further includes an actuator to selectively adjust the movement of the first and second arm members.

39. The apparatus of claim 38 wherein each said actuator is a fluid piston device.

40. The apparatus of claim 25 wherein the actuator is a fluid piston device.

41. The apparatus of claim 25 wherein the cover includes a spool and a flexible cover element selectively wound and unwound from the spool.

42. The apparatus of claim 41 wherein the spool is attached to the second arm member.

\* \* \* \* \*